(12) United States Patent
Brown et al.

(10) Patent No.: US 12,371,896 B2
(45) Date of Patent: Jul. 29, 2025

(54) EXPANSION JOINT

(71) Applicant: RENTOKIL INITIAL 1927 PLC, Crawley (GB)

(72) Inventors: Mark Brown, Prestatyn (GB); Craig Alan Jones, Prestatyn (GB)

(73) Assignee: RENTOKIL INITIAL 1927 PLC (GB)

( * ) Notice: Subject to any disclaimer, the term of this patent is extended or adjusted under 35 U.S.C. 154(b) by 147 days.

(21) Appl. No.: 18/027,247

(22) PCT Filed: Sep. 13, 2021

(86) PCT No.: PCT/GB2021/052372
§ 371 (c)(1),
(2) Date: Mar. 20, 2023

(87) PCT Pub. No.: WO2022/064175
PCT Pub. Date: Mar. 31, 2022

(65) Prior Publication Data
US 2023/0374779 A1    Nov. 23, 2023

(30) Foreign Application Priority Data
Sep. 22, 2020   (GB) ...................................... 2014939

(51) Int. Cl.
*E04B 1/68* (2006.01)
*E04B 1/72* (2006.01)

(52) U.S. Cl.
CPC .............. *E04B 1/6812* (2013.01); *E04B 1/72* (2013.01)

(58) Field of Classification Search
CPC ................... E04B 1/6812; E04B 1/72
(Continued)

(56) References Cited

U.S. PATENT DOCUMENTS 4,084,348 A * 4/1978 Hast ..................... E06B 7/231
428/129
4,156,533 A * 5/1979 Close .................. F16J 15/065
277/933
(Continued)

FOREIGN PATENT DOCUMENTS

| CL | 47632 B1 | 10/2001 |
| JP | 1060413 A | 3/1998 |
| WO | 2006084329 A1 | 8/2006 |

OTHER PUBLICATIONS

Great Britain Search Report for Great Britain Application No. GB2014939.9, dated Feb. 17, 2021, 4 pages.
(Continued)

*Primary Examiner* — Paola Agudelo
(74) *Attorney, Agent, or Firm* — Buchanan Ingersoll & Rooney PC

(57) ABSTRACT

An expansion joint for providing a rodent-proof barrier. The expansion joint comprises an elongate core formed of a resiliently deformable material, and a flexible sheath of a barrier material covering at least a part of the elongate portion of the elongate core. The elongate portion of the elongate core is compressible in a direction perpendicular to a line between the first and second ends of the elongate core, the elongate core being arranged to be compressed and inserted into a gap between first and second building structures, and to expand after insertion into the gap so that the expansion joint is held in place within the gap by friction between the surface of the flexible sheath and the surfaces of the first and second building structures.

11 Claims, 4 Drawing Sheets

(58) Field of Classification Search
USPC .......................................................... 52/393
See application file for complete search history.

(56) References Cited

U.S. PATENT DOCUMENTS

| | | | | |
|---|---|---|---|---|
| 4,330,136 | A * | 5/1982 | Henson | F16J 15/104 277/921 |
| 5,072,952 | A * | 12/1991 | Irrgeher | E04B 1/6812 49/498.1 |
| 5,417,017 | A * | 5/1995 | Toutountzis | A01M 1/24 245/8 |
| 6,276,096 | B1 * | 8/2001 | Fair | B60P 3/36 52/293.3 |
| 6,672,597 | B1 * | 1/2004 | Irrgeher | E06B 1/62 229/87.05 |
| 7,469,459 | B2 * | 12/2008 | Kosal | B29C 44/18 29/455.1 |
| 8,318,304 | B2 * | 11/2012 | Valenziano | C09K 21/00 428/372 |
| 8,578,672 | B2 * | 11/2013 | Mattox | E04B 1/948 52/396.04 |
| 9,021,754 | B2 * | 5/2015 | Wormann | E04B 1/6812 52/214 |
| 9,523,232 | B2 * | 12/2016 | Han | E06B 1/58 |
| 2001/0028931 | A1 * | 10/2001 | Arnold | E06B 7/23 428/36.1 |
| 2013/0026670 | A1 * | 1/2013 | Birch | B29C 44/1214 264/41 |
| 2016/0208480 | A1 * | 7/2016 | Hensley | B29C 44/5627 |
| 2018/0245730 | A1 * | 8/2018 | Yaeger | A01M 29/30 |
| 2023/0075989 | A1 * | 3/2023 | Brown | A01M 29/30 |

OTHER PUBLICATIONS

International Search Report (Form PCT/ISA/210) and the Written Opinion of the International Searching Authority (Form PCT/ISA/237) issued Dec. 20, 2021, by the European Patent Office in corresponding International Application No. PCT/GB2021/052372. (13 pages).

* cited by examiner

EXPANSION JOINT

CROSS REFERENCE TO RELATED APPLICATIONS

This application is a U.S. National Phase application of PCT International Application No. PCT/GB2021/052372, filed Sep. 13, 2021, which claims the benefit of GB Application No. 2014939.9, filed Sep. 22, 2020, the subject matter of each of these applications being incorporated by reference herein in their entireties for all purposes.

FIELD OF THE INVENTION

The present invention concerns expansion joints, and methods of bridging gaps between first and second building structures using an expansion joint. More particularly, but not exclusively, the invention concerns expansion joints for insertion into a gap between building structures, to bridge the gap to form a barrier to rodents.

BACKGROUND OF THE INVENTION

It is common for gaps to be present between building structures such as walls, concrete slabs or the like. FIG. 1a shows such a gap 1, which is between walls 2 and 3. The gap 1 is an expansion gap provided to prevent damage to the walls when they expand and contract due to ambient temperature and moisture changes. FIG. 1b shows another such gap between building structures, which is a "weep hole" 4 provided between bricks 5 and 6. Weep holes are provided on the exterior of buildings to allows moisture that has built up inside the building to escape. Expansion gaps are also commonly found between concrete slabs forming the floor of a warehouse or the like.

It is a disadvantage of such gaps that they can entered by rodents, and used as a place to reside, store food, and/or as a route for travel, for example.

It is known to seal such gaps using expansion joints that are placed into a gap, sometimes along with a filler, to fill the gap or the outer part thereof. However, to allow for changes in size of the gap due to expansion and contraction of the building structures, the expansion joint and filler must be made of flexible materials such as foam and epoxy resin. These flexible materials can easily be gnawed through by rodents, allowing their entry into the gap.

US 2013/0026670 A1 published 31 Jan. 2013 discloses placing a mesh tube in a cavity, and subsequently introducing a foamable liquid mixture into the mesh tube, such that mesh tube expands in the cavity. As the mesh tube expands, the foamable liquid flows through openings in the mesh tube and makes contact with the cavity walls, such that after curing the foam adheres to the cavity walls. It is a disadvantage that the foam flows through the openings in the mesh tube, as this means that the mesh tube cannot protect the foam that is outside the mesh tube from damage by rodents. Further, the need to cure the foam in the cavity means that filling the cavity takes a relatively long amount of time.

It would be advantageous to be able to seal such gaps between building structures in a way that prevents entry by rodents to the gap.

The present invention seeks to solve and/or mitigate some or all the above-mentioned problems. Alternatively and/or additionally, the present invention seeks to provide improved expansion joints for providing a rodent-proof barrier, and improved methods of bridging gaps between first and second building structures using an expansion joint.

SUMMARY OF THE INVENTION

In accordance with a first aspect of the invention there is provided an expansion joint providing a rodent-proof barrier, the expansion joint comprising:

an elongate core formed of a resiliently deformable material, the elongate core comprising an elongate portion and first and second ends; and a flexible sheath of a barrier material covering at least a part of the elongate portion of the elongate core;

wherein the elongate portion of the elongate core compressible in a direction perpendicular to a line between the first and second ends of the elongate core, the expansion joint being arranged to be compressed and inserted into a gap between first and second building structures, and to expand after insertion into the gap so that the expansion joint is held in place by friction between the surface of the flexible sheath and the surfaces of the first and second building structures.

By having an elongate core that is formed of a resiliently deformable material, the expansion joint can be pushed into a gap between the first and second building structures, and the elongate core will compress in order to fit in the gap.

The expansive force of the elongate core will then act to keep the expansion joint in place within the gap once fitted, due to friction between the surface of the flexible sheath of the expansion joint and the surfaces of the first and second building structures. The gap between the building structures is thus bridged by the expansion joint. The flexible sheath then provides a barrier to rodents, as the rodents cannot exert enough force with their teeth and/or claws to break through the flexible sheath, and consequently the expansion joint prevents them from entering the gap. The flexible sheath also advantageously prevents rodents from accessing the elongate core, so they cannot chew or otherwise damage the elongate core.

As the elongate core of the expansion joint is resiliently deformable, the expansion joint can be installed in a gap between building structures quickly and with minimal if any preparation being required. Further, the elongate core being resiliently deformable allows the expansion joint to change in size to accommodate changes in the size of the gap, which as discussed above, can occur due to the building structures expanding or contracting as a result of moisture or temperature changes in the environment. The flexible sheath being flexible allows it to move and flex with the elongate core as it is pressed into the gap, and when changes in the size of the gap occur, and allows the flexible sheath to withstand the forces exerted on the expansion joint as it is fitted without being damaged.

The building structures may for example be walls or ceilings in buildings, such as residential premises or factories. The building structures may be concrete slabs. Alternatively, the building structures may be bricks. The gap to be bridged may be an expansion gap or a weep hole.

The entirety of the elongate portion of the elongate core may be covered by the flexible sheath. The first and/or second end of the elongate cover may be covered by the flexible sheath.

The elongate portion of the elongate core may have a constant cross-section along its length. The cross-section may be a circle, oval, square, rectangle, or any other suitable shape.

Advantageously, the flexible sheath is formed of a woven material. Advantageously, the woven material is a continuous weave. A continuous weave can be free of discontinuities, such as knots, or bonded joints (for example soldered, welded or glued joints). The absence of such discontinuities results in the flexible sheath comprising fewer stress concentrations. It also advantageously allows for a simplified manufacturing process for the expansion joint, with no bonding or knot tying operations required in the forming of the flexible sheath. Advantageously, woven material is formed of woven metal wire. The woven material may be a knitted mesh of metal wire, for example. A woven metal wire provides a suitably flexible and resilient material to form the flexible sheath, while also being very tough so provides a good barrier against damage by rodents or the like, in particular damage by chewing. Alternatively, the continuous weave of material may be formed of a high tensile-strength polymer, such as Kevlar.

In a continuous weave of material, long threads of material may be crossed over each other repeatedly in order to form the material.

Advantageously, the elongate core comprises a prefabricated foam tube. The foam tube may be formed of polyethylene foam, for example, but it will be appreciated that any other suitable material may be used. The foam tube may be solid. Alternatively, the foam tube may be hollow. The flexible sheath may be shaped such that is substantially the same cross-section as the foam tube.

Advantageously, the flexible sheath is held in place on the elongate core by friction between the flexible sheath and the surface of the elongate core. This allows for simple manufacture of the expansion joint, as no bonding is required in order to for the flexible sheath to be held in place on the elongate core. Advantageously, the elongate core when uncompressed is slightly larger in cross-section than the interior cross-section of the flexible sheath, so that the elongate core exerts an expansive force on the flexible sheath when in position within the flexible sheath, helping the flexible sheath to be firmly held in place on the elongate core.

The expansion joint may have a diameter of at least 2 cm.

The expansion joint may be sized for a particular gap between first and second building structures, in other words having a length substantially the same as the length of the gap, and a width slightly greater than the width of the gap.

In accordance with a second aspect of the invention there is provided a method of bridging a gap between first and second building structures using an expansion joint as described above, or manufactured as described above, wherein a width of the elongate portion of the elongate core of the expansion joint in a direction perpendicular to a line between the first and second ends of the elongate core is greater than the width of the gap, the method comprising the steps of:

compressing the elongate core in the direction perpendicular to a line between the first and second ends of the elongate core;

inserting the expansion joint into the gap; and allowing the expansion joint to expand such that the expansion joint is held in place within the gap by friction between the surface of the flexible sheath of the expansion joint and the surfaces of the first and second building structures.

Advantageously, the method comprises, prior to inserting the expansion joint in the gap, the steps of:

selecting an elongate core, the width of the elongate portion of the elongate core of the expansion joint in a direction perpendicular to a line between the first and second ends of the elongate core being greater than the width of the gap; and covering at least a part of the elongate portion of the elongate core with the flexible sheath.

The elongate core may be chosen in size such that it can expand or contract in width sufficiently to accommodate the expected range of change in size of the width of the gap.

The length of the expansion joint may be the same or substantially the same as the length of the gap.

Advantageously, the method further comprises the steps of applying a filler layer and/or a finishing layer to the gap to cover the expansion joint. Such filler layer and/or finishing layer may further protect the expansion joint. The filler layer and/or finishing layer may be applied to such that a continuous surface is formed between the first and second building structures.

It will of course be appreciated that features described in relation to one aspect of the present invention may be incorporated into other aspects of the present invention. For example, the method of the invention may incorporate any of the features described with reference to the apparatus of the invention and vice versa.

DETAILED DESCRIPTION

Figure 1A:
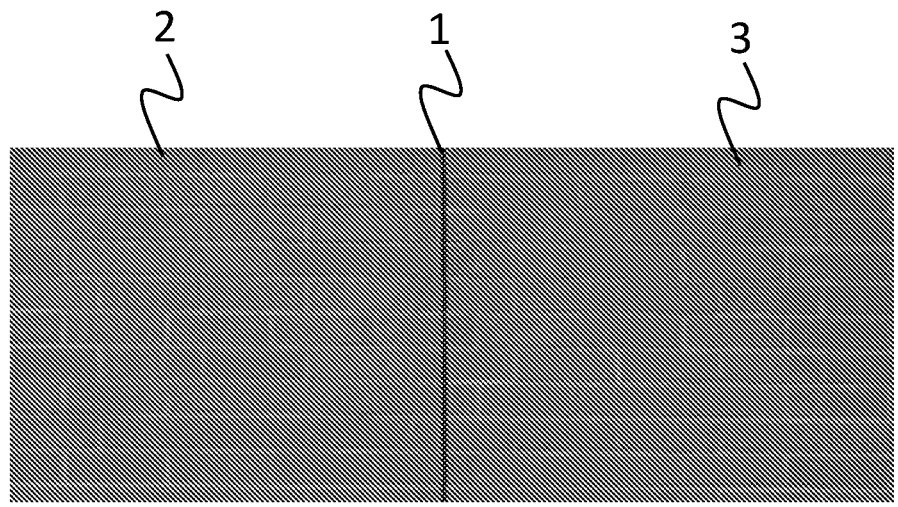
FIG. 1a shows an expansion gap in a wall.
Figure 1B:
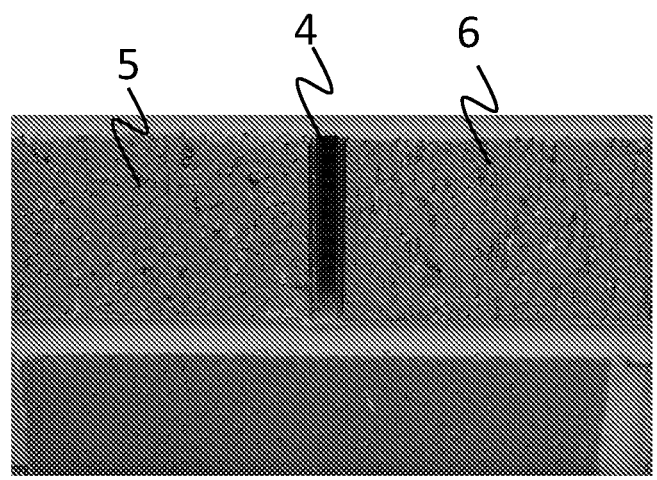
FIG. 1b shows a weep hole between bricks in a wall.
Figure 2:
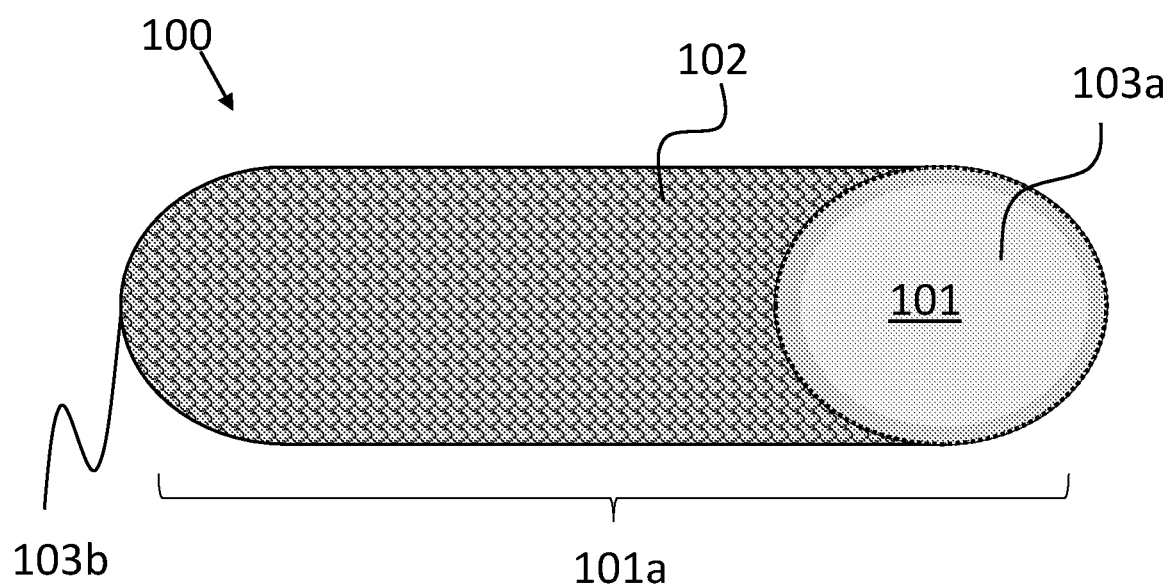
FIG. 2 is a perspective view of an expansion joint according to an embodiment of the invention.

An expansion joint for providing a rodent-proof barrier in accordance with an embodiment of the invention is now described, with reference to FIG. 2.

FIG. 2 shows a perspective view of the expansion joint 100. The expansion joint 100 comprises a cylindrical elongate core 101 having an elongate portion 101a with a first end 103a and a second end 103b. The elongate core 101 is formed of polyethylene foam, but in other embodiments of the invention the elongate core 101 may be formed of other resiliently deformable materials, such as other types of polymer foam, or any other material with suitable resiliently deformable properties. The elongate core 101 is a solid tube, but in other embodiments it may be hollow, and/or may be another elongate shape, such as oval, rectangular, C-shaped, or another shape in cross-section.

The expansion joint 100 further comprises a flexible sheath 102, which covers of the elongate portion 101a of the elongate core 101. The flexible sheath 102 does not cover the first end 103a and a second end 103b of the elongate core 101, but in other embodiments the first end 103a and a second end 103b may be covered by the flexible sheath 102. The flexible sheath 102 is made of woven metal wire, in particular a knitted mesh of stainless steel wire. In other embodiments the flexible sheath 102 may be formed of other materials, for example a polymeric mesh such as Kevlar. In other embodiments of the invention, the flexible sheath 102 comprise a combination of metallic and polymeric threads, for example. The flexible sheath 102 may comprise a continuous weave of material, in other words it is formed of interlocking loops of a single thread (or wire of the like), so that the flexible sheath 102 with no discontinuities or breaks such as would be formed by knots or bonding of the threads of the flexible sheath).

The elongate core 101 is compressible, and is when uncompressed slightly larger in diameter than the inside of the flexible sheath 102. The elongate core 101 is thus kept in slight compression by the flexible sheath 102, and consequently exerts an expansive force on the flexible sheath 102, keeping the flexible sheath 102 in position on the elongate core 101 by friction between the exterior surface of the elongate core 101 and the interior surface of the flexible sheath 102. In other embodiments the flexible sheath 102 may be fixed in position on the elongate core 101, for example by glue.

The expansion joint is 2 cm in diameter and 1m in length, but it will be appreciated that many other dimensions of the expansion joint could be used in other embodiments of the invention.

Figure 3:
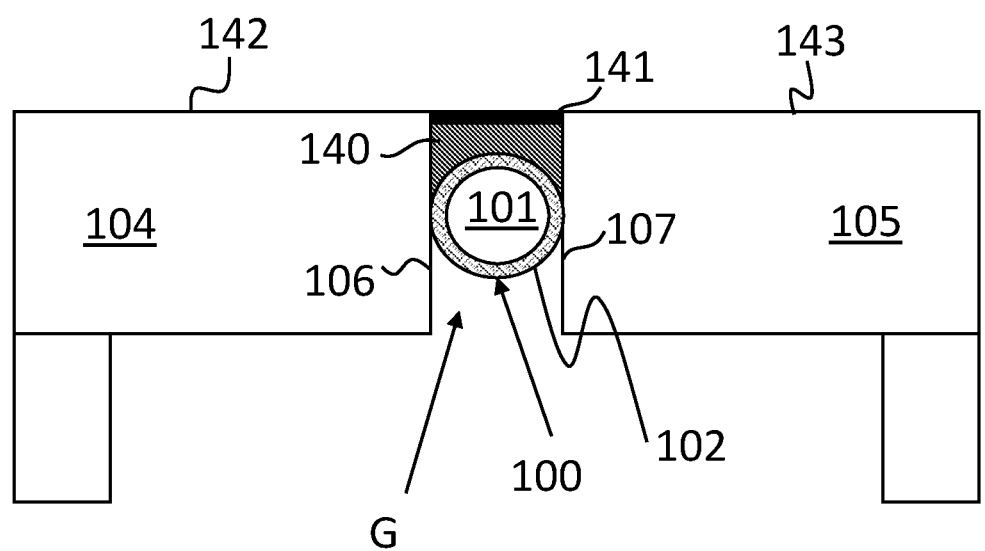
FIG. 3 shows the expansion joint of the first embodiment installed in a gap between first and second building structures.
Figure 4:
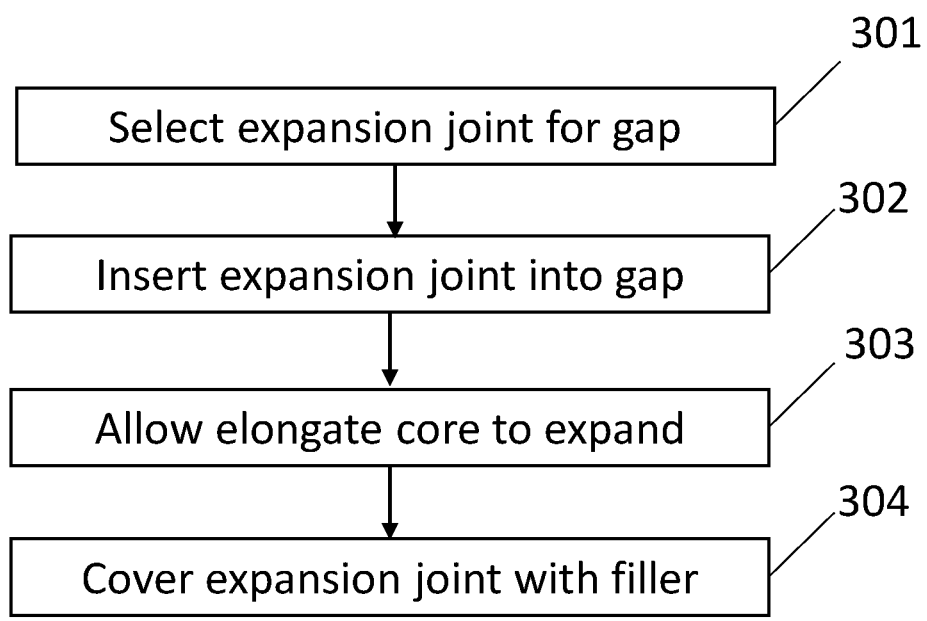
FIG. 4 is a flowchart describing the installation of the expansion joint shown in FIG. 3.

The installation of the expansion join 100 in a gap between building structures is now described, with reference to FIGS. 3 and 4. The building structures are a first concrete slab 104 and a second concrete slab 105, which have between them a gap G, of width 1.5 cm.

In a first step, an expansion joint for the gap G is selected (step 301). The expansion joint is selected so that when uncompressed it is has a diameter slightly greater than the width of the gap into which it is to be installed. In the present embodiment, the expansion joint 100 is selected, as it has a diameter of 2 cm, and the gap G has a width 1.5 cm.

In embodiments of the invention, the expansion joint may be manufactured on-site, i.e. the elongate core inserted into the flexible sheath only after the gap to be filled is known. This allows a suitable length of elongate core and flexible sheath to be selected, possibly by cutting either or both to the required length. In other embodiments, the expansion joint is manufactured off-site.

The expansion join 100 is then inserted into the gap G (step 302). As the width of the gap G is smaller than the diameter of the elongate core 101, and thus of the expansion joint 100, it the elongate core 101 is compressed as the expansion joint 100 is inserted into the gap G. However, as the elongate core 101 is resiliently deformable, and the flexible sheath 102 is flexible, this is easily done.

Once in position within the gap G, the expansion join 100, and in particular its elongate core 101, is allowed to expand (step 303). As the width of the gap is less than the width of the expansion joint 100 when uncompressed, the expansion joint 100 (and in particular the elongate core 101 thereof) expands to touch the surface 106 of the first concrete slab 104 and the surface 107 of the second concrete slab 105 that form the gap G, so that it completely spans the gap G. Once expanded as much as it is able the elongate core 101 exerts an expansive force on the surface 106 and 107, via the flexible sheath 102, so that the expansion joint 100 is held in place in the gap G by friction between its surface (in particular the outer surface of the flexible sheath 102) and the surfaces 106 and 107.

A filler layer 140 and/or a finishing layer 141 is then applied to the gap G, to cover the expansion joint 100. The filler layer 140 may for example be an epoxy resin, and the finishing layer 141 is a material chosen to complement or match the appearance of outer surfaces 142 and 143 of the first concrete slab 104 and a second concrete slab 105, but it will be appreciated that the filler layer 140 and/or finishing later 121 could be various other suitable materials.

When the expansion joint 100 has been installed, a rodent attempting to pass the expansion joint 100 to enter the gap G will be met by the flexible sheath 102 of the expansion join 100, as the flexible sheath 102 spans the width of the gap G, due to the expansive force of the elongate core 101 pushing it outwards to touch the surfaces 106 an 107 of the gap G. The rodent is unable to penetrate the flexible sheath 102 due to its barrier properties, and so unable to pass the expansion joint 100 to enter the gap G. Further, the rodent will also be prevented from reaching the elongate core 101 of the expansion joint 100 by the flexible sheath 102, and so the rodent is unable to damage the elongate core 101.

While the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An expansion joint for providing a rodent-proof barrier, the expansion joint comprising:
    an elongate core formed of a resiliently deformable material, the elongate core comprising an elongate portion and first and second ends; and
    a flexible sheath of a barrier material covering at least a part of the elongate portion of the elongate core;
    wherein the elongate portion of the elongate core is compressible in a direction perpendicular to a line between the first and second ends of the elongate core, the elongate core being arranged to be compressed and inserted into a gap between first and second building structures, and to expand after insertion into the gap so that the expansion joint is held in place within the gap by friction between the surface of the flexible sheath and the surfaces of the first and second building structures,
    and wherein the flexible sheath is formed of woven metal wire.

2. The expansion joint as claimed in claim 1, wherein the elongate portion of the elongate core has a constant cross-section along its length.

3. The expansion joint as claimed in claim 1, wherein the woven metal wire is a continuous weave.

4. The expansion joint as claimed in claim 1, wherein the elongate core comprises a prefabricated foam tube.

5. The expansion joint as claimed in claim 1, wherein the flexible sheath is held in place on the elongate core by friction between the flexible sheath and the surface of the elongate core.

6. The expansion joint as claimed in claim 1, wherein the woven metal wire is a knitted mesh of metal wire.

7. The expansion joint as claimed in claim 1, wherein the elongate core when uncompressed is larger in cross-section than the interior cross-section of the flexible sheath, so that the elongate core exerts an expansive force on the flexible sheath when in position within the flexible sheath.

8. A method of bridging a gap between first and second building structures using an expansion joint as claimed in claim 1, wherein a width of the elongate portion of the elongate core of the expansion joint in a direction perpendicular to a line between the first and second ends of the elongate core is greater than the width of the gap, the method comprising the steps of:
- compressing the elongate core in the direction perpendicular to a line between the first and second ends of the elongate core;
- inserting the expansion joint into the gap; and
- allowing the elongate core to expand such that the expansion joint is held in place within the gap by friction between the surface of the flexible sheath of the expansion joint and the surfaces of the first and second building structures.

9. The method as claimed in claim 8, further comprising, prior to inserting the expansion joint in the gap, the steps of:
- selecting an elongate core, the width of the elongate portion of the elongate core of the expansion joint in a direction perpendicular to a line between the first and second ends of the elongate core being greater than the width of the gap; and
- covering at least a part of the elongate portion of the elongate core with the flexible sheath.

10. The method as claimed in claim 8, further comprising the step of applying a filler layer and/or a finishing layer to the gap to cover the expansion joint.

11. The method of claim 10, wherein the filler layer is an epoxy resin.

* * * * *